United States Patent [19]
Heath

[11] 3,757,320
[45] Sept. 4, 1973

[54] OPTICAL DIGITAL MEASUREMENT READOUT

[76] Inventor: Michael D. Heath, 20552 Wayne Avenue, Torrance, Calif. 90503

[22] Filed: Feb. 22, 1971

[21] Appl. No.: 117,395

[52] U.S. Cl.................... 340/336, 33/1 D, 40/28 C, 340/378 R
[51] Int. Cl............................................. G09f 9/30
[58] Field of Search .............33/146–148, 1 D, 1 L; 340/324, 334, 336, 339, 337, 338, 378 R; 178/15, 30; 40/28 C, 132 R, 132 F

[56] References Cited
UNITED STATES PATENTS

| 2,969,531 | 1/1961 | Stewart | 340/324 R |
|---|---|---|---|
| 2,645,047 | 7/1953 | O'Gorman | 340/339 |
| 3,060,584 | 10/1962 | Westfall | 33/1 D |
| 2,876,543 | 3/1959 | Dzaack | 33/1 D |
| 3,042,912 | 7/1962 | Gilbert | 340/336 |
| 3,573,813 | 4/1971 | Burns et al. | 178/30 |
| 3,399,474 | 9/1968 | Rinder | 340/336 |

Primary Examiner—John W. Caldwell
Assistant Examiner—Marshall M. Curtis
Attorney—Sokolski & Wohlgemuth and John Holtrichter, Jr.

[57] ABSTRACT

A readout system using a matrix optical system whereby a decoder member and an encoder member are operatively associated in a manner allowing parallel relative movement therebetween only along a uniform predetermined path whereby different ones of light transmissive areas in the encoder member, which are arranged in a basic matrix pattern but defining a series of information indicia, are made visible by this relative movement as light passes through only those light transmissive areas of the encoder which are aligned with light transmissive areas in the decoder member that are grouped in the basic matrix pattern.

16 Claims, 16 Drawing Figures

PATENTED SEP 4 1973  3,757,320

Michael D. Heath,
INVENTOR.

BY

*John Holbrichter Jr.*

ATTORNEY.

PATENTED SEP 4 1973          3,757,320
SHEET 2 OF 3
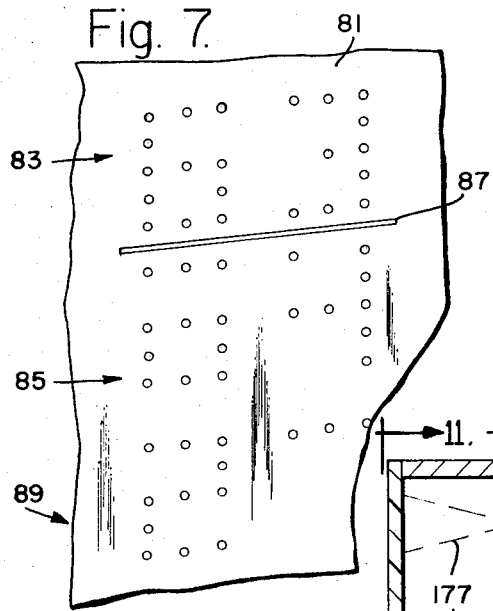
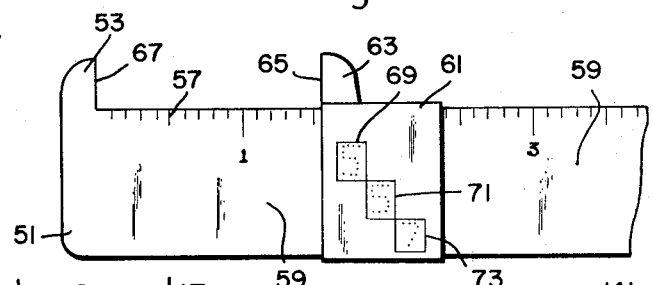
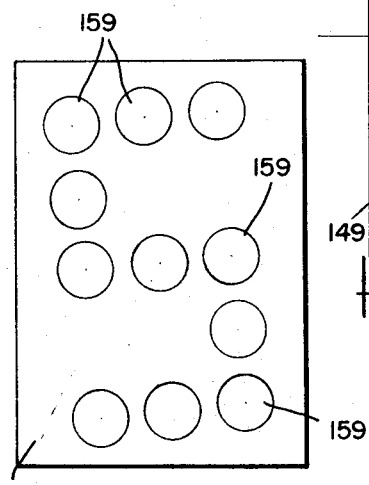
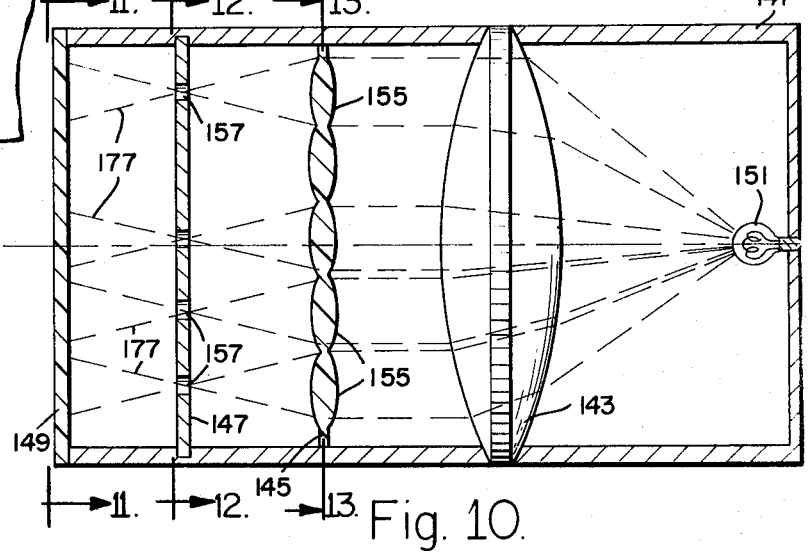
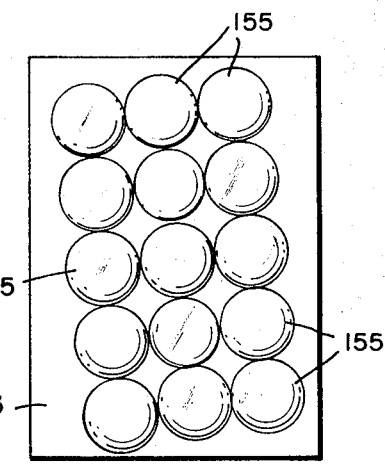
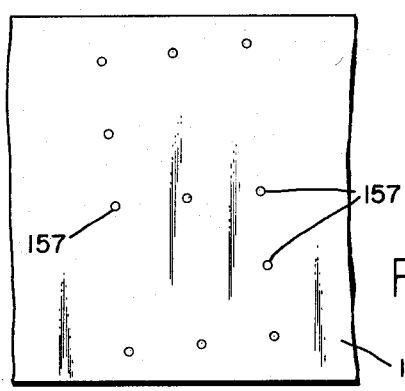

PATENTED SEP 4 1973

OPTICAL DIGITAL MEASUREMENT READOUT

BACKGROUND OF THE INVENTION

The background of the invention will be set forth in two parts.

1. Field of the Invention

The present invention pertains generally to the field of readout systems and more particularly to an optical readout using a self-digitalizing optical scale.

2. Description of the Prior Art

Display devices using optical arrangements have long been known. One technique includes a matrix of light which may be individually and selectively energized by rather complicated electrical circuitry for forming the outline of alphabetical letters and numbers.

Other display devices utilize a plurality of light sources at each display station so that the light sources may be selectively activated to illuminate elongated windows to form a recognizable character. Such devices require expensive decoding circuits to form the desired display from an input signal. These display devices may use neon lights, but this entails the use of a very high voltage power supply which is expensive and prone to break down.

Another technique in the display art uses a light source directed toward a stack of overlapping movable plates, each of which is perforated in selected areas and selected ones of these plates may be concurrently displaced into a position for machine reading by photo sensing or other means. A decoding means is necessary in order to translate the coded display into one recognizable by a viewer. The prior art also includes devices utilizing a common light directed toward an observer through character forming plates having sections of polarized material for control of the light passing through the plates, one plate being required for each character. This type of display requires a rather complex and expensive relay or electronic circuitry for translating electrical or mechanical representation of characters into their visual counterparts.

Still another technique uses a simple light source, the light from which is directed toward a plurality of movable plates arranged in a stack, each of which has a particular character outline thereon, and each of which may be displayed by displacing it from the common stack so that it alone is properly positioned for direct observation. This method is less costly than the multiple light devices previously described but has the disadvantage of requiring an elaborate and expensive mechanical or electro-mechanical arrangement to move the plates to their proper positions.

In this same general category, some display devices require three and usually four stacked plates and an elaborate, heavy and costly mechanical plate moving mechanism to move the selected plates into their proper positions. There have been, however, devices of this general type which have only two stacked plates, but these schemes require that the plates be moved in very complicated and non-uniform directions in order to provide a suitable display. The mechanism required for this movement, such as vertically, horizontally and diagonally, is bulky and expensive and generally requires a plurality of input signals.

An area of great interest which directly relates to the optical readout art is that of digital measurement. In the past, this type of measurement required complicated electronic systems based on either pulse counting or absolute encoding. In the optical absolute encoder system, a light source is interrupted by a disc or strip containing some form of binary code. A series of photo cells and amplifiers feed the coded position information to electronic circuits and drivers which in turn switch on the proper lights in a system having a series of usually seven segment digital readouts. The human brain is then able to interpret thses lighted bars or dots as numbers representing the measured distance. It should thus be evident that an encoder which can produce a light pattern in the form of decimal or fractional characters and which could be seen and interpreted directly by an operator would constitute a significant advancement of the art.

SUMMARY OF THE INVENTION

In view of the foregoing factors and conditions characteristic of the prior art, it is a prime object of the present invention to provide a new and improved optical readout system not subject to the disadvantages enumerated above. It is another object of the present invention to provide an optical readout system not requiring an expensive and complicated decoding arrangement and which does not require any particular light source.

It is also another object of the present invention to provide a lightweight and dependable yet simple optical readout system which may be portable and carried about in its user's pocket or brief case, for example.

It is still another object of the present invention to provide an optical readout system capable of being coupled or made an integral part of the measuring tool and the like for a direct visual display of the measurement taken by such a tool.

It is yet another object of the present invention to provide an optical readout system capable of displaying a distinguishable and accurate readout even with very slight movement of its two movable parts.

It is a further object of the present invention to provide an optical readout system utilizing fiber optics to change the shape and/or position of lighted areas produced by an encoder and decoder arrangement.

It is still a further object of the present invention to provide an optical readout system including an encoder which produces light pattern in the form of decimal or fractional numbers that can be seen and interpreted directly by an operator through the use of a suitably constructed decoder.

According to the present invention, an optical readout system is provided which includes a decoder member having light transmissive areas therein, these areas being arranged in a basic matrix pattern, and an encoder member having light transmissive areas therein which are arranged within the matrix pattern but define a series of information indicia. Operatively coupled to these members are means for allowing parallel relative movement therebetween only along a uniform predetermined path whereby different ones of the information indicia are made visible by the relative movement as light passes through the light transmissive areas of the members only where the light transmissive areas in the members are aligned.

The features of the present invention which are believed to be novel are set forth with particularity in the appendant claims. The present invention, both as to its organization and manner of operation, together with further objects and advantages thereof, may thus be un-

BRIEF DESCRIPTION OF THE DRAWINGS

FIG. 5 is a diagrammatical representation of a caliper incorporating the optical readout system of the present invention;

FIG. 7 is an enlarged view of a readout portion of a caliper of the type shown in FIG. 1 in accordance with another embodiment of the present invention;

FIG. 10 is a side view of still another embodiment of the present invention in which rear projection is provided;

FIG. 11 is a sectional view parallel to the plane of the ground glass screen of a device shown in FIG. 10 taken along line 11—11;

FIG. 12 is a sectional view of FIG. 10, showing the movable encoder element which is taken along line 12—12;

FIG. 13 is a sectional view along line 13—13 of FIG. 10, showing the lens matrix.

DESCRIPTION OF THE INVENTION

Figure 1A:
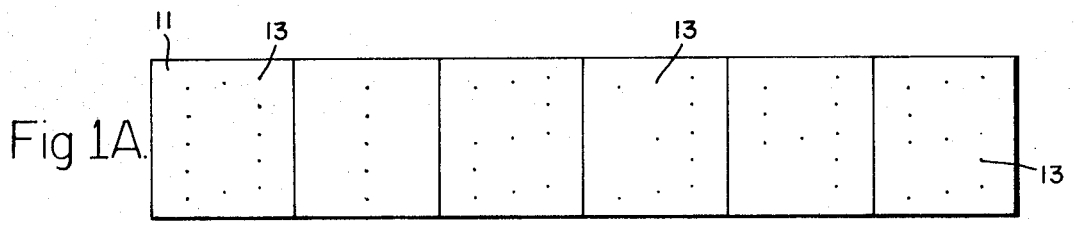
FIGS. 1A–1C illustrate a principle of an embodiment of the present invention where two overlapping opaque plates each have light transmissive areas arranged such that a different numeral is visible for different relative positions of the plate as they move along a predetermined uniform path.
Figure 1B:
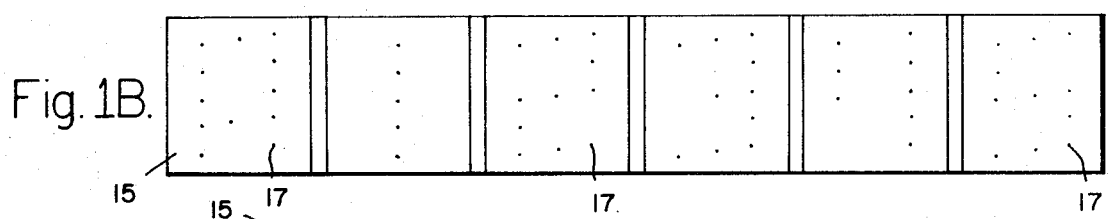

The basic features of a matrix optics readout device in accordance with an embodiment of the present invention is illustrated in FIG. 1 and consists of two plates (such as film negatives) each with holes or clear spaces (light transmitting) arranged in a matrix. The plates are mounted to allow parallel motion relative to each other so that the movement is restricted to follow a uniform path.

The movable plate or matrix mask is placed over the fixed matrix scale so that when the assembly is illuminated from the rear, lighted dots can be seen only at the locations where holes in both plates are aligned. Thus, in FIG. 1A, A matrix mask 11, of a material or having a coating which does not transmit light (opaque) includes light transmitting areas such as holes 13 arranged to present a series of information indicia such as 0 through 5. The same is true for the fixed scale 15 in FIG. 1B with its hole 17, but here the numerals outlined by hole 17 are progressively positioned a fixed distance to the right so that when any one of the numerals in the mask 11 is aligned with the same numeral in the fixed scale 15, light is allowed to propagate through the aligned holes 13 and 17. Of course, the other numerals in the plate will not be aligned and will not be seen.

Figure 1C:
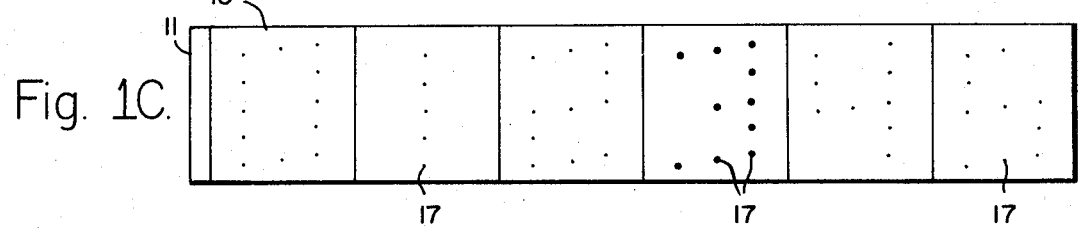

This condition is illustrated in FIG. 1C where the matrix mask has been advanced three-tenths of an inch to illuminate only the 3.

Figure 2:
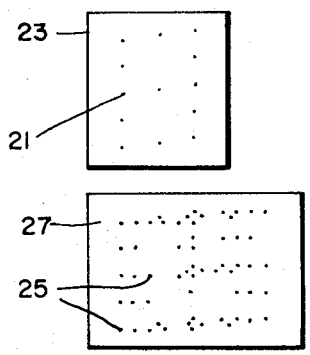
FIG. 2 illustrates a scheme whereby all the numerals separately set forth in the plates of FIG. 1 are condensed.

It should be obvious from FIG. 1 that the arrangement where each of the characters is separated from each other by a relatively long distance is not practical. Accordingly, in accordance with the present invention, the matrix mask and fixed scale are preferably arranged as illustrated in FIG. 2. Here, all numerals from 0 to 5 may be formed within a basic matrix structure wherein holes 21 are provided in the mask 23, and the numerals from 0 to 5 are provided by holes 25 in the fixed scale 27 such that these numerals are superimposed over one another with each numeral displaced laterally from a preceding numeral by a predetermined distance, such as, for example, one tenth of an inch. It can be seen that the same phenomenon will take place as described with FIG. 1 when the mask plate 23 is placed over the scale plate 27. That is, in this embodiment the numerals will make themselves apparent when and only when the measured distance the mask has moved is numerically equal to the number displayed.

It will be noted that the holes or transparent areas may be few in number but are carefully arranged in the matrix so that unintentional alignment of these areas is essentially eliminated. In the system shown in FIGS. 1 and 2, each of the thirteen holes used to form the numerals is on a separate vertical track. It should be obvious that the holes or areas may be made smaller to increase the resolution of the scale or readout. This may be accomplished, for example, by making the dot matrix on a large scale drawing so that a reduced size negative (on micro-film) of the drawing results in extremely fine optical resolution. In this form, the individual dot or light transmitting area could be too small to be seen, but the numeral would be large enough to be visible without magnification.

Figure 3:
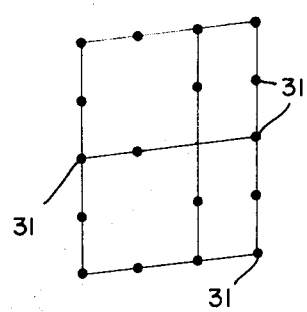
FIG. 3 is a matrix format for horizontal relative motion where the matrix is slanted with a slope of approximately 8:1.
Figure 4:
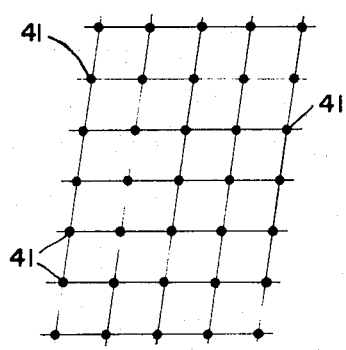
FIG. 4 is a matrix alpha numerical character format for vertical motion and having a slope of 7:1.

In order to reduce the possibility of incorrect or confusing readings where the characters are small and/or closely spaced, the matrix is preferably slanted as illustrated in FIGS. 3 and 4. FIG. 3 shows a matrix comprising five visible areas or dots 31 along vertical lines and four dots 31 in width with a slope of 8:1. This particular arrangement is very suitable for uniform horizontal relative motion between the mask and the scale member. For uniform vertical movement, a matrix pattern having seven dots 41 high and five dots 41 wide with a slope of 7:1 may be used.

The description above should make clear that the scale number functions as an encoder comprising a plurality of specially arranged light transmissive areas to represent a series of information characters. On the other hand, the matrix mask acts as a decoder and displays only the number or character corresponding to the positions of the mask relative to the scale or encoder member.

Figure 6:
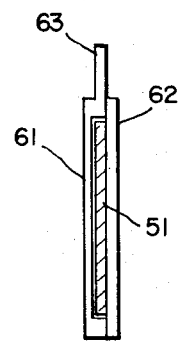
FIG. 6 is an end view of the caliper shown in FIG. 5.

FIGS. 5 and 6 illustrate a practical and advantageous embodiment of the present invention in a form of a caliper scale. The encoder and decoder elements in this case are similar to the plates or elements illustrated in FIG. 2 and include a fixed caliper scale plate 51 with an end jaw 53, a system of uniform graduation 55 along an edge 57, and a plurality of specially arranged light transmissive holes or dots 59, as described in detail previously. A matrix mask plate 61 is slidably attached to the scale plate 51 by a square U-shaped back bracket 62 such that its jaw portion 63 cooperates with the scale plate jaw 53 for precise measurement of the distance between inner jaw edges 65 and 67, respectively. In the mask plate 61, are located three windows 69, 71 and 73, each displaced diagonally with respect to an adjacent window. In this embodiment, a decimal readout is provided where the window 69 reads tenths of an inch, the window 71 reads one hundredths of an inch, and the window 73 reads one thousandths of an inch. Thus, for a particular setting of the movable mask plate 61 on the scale plate 51, a unique decimal readout will be shown in the three windows indicating the distance, to the thousandths of an inch, between the jaw edges 65 and 67 beyond 1 inch (as shown by the 1 along the scale graduation 55). For example, the readout of the device of FIG. 5 is 1.557 inch.

Alternatively, a movable matrix mask 81, similar in function to mask 61, may be provided with a caliper readout displaying fractions of an inch to as much as one one hundred twenty-eighth inch, as shown in FIG. 7. The upper two rows of digits, 83 and 85, which are separated by a fraction bar 87, indicate fractions of an inch down to one sixty-fourth inch (63/64 being shown), while a lower row of digits 89 indicate fractional parts of an inch divided by 1/128 (127/128 being shown). These two numerical readout sets are arranged to overlap slightly so that some readout information is displayed at all times.

Where, as here, the system is not limited to a readout for discrete steps or positions along the fixed scale, the use of this dual readout is of significant importance since it prevents "blind spots" on the scale and doubles the resolution available with a given size hole or dot in the scale and mask. Also, when both the upper and lower readout can be read simultaneously, the device indicates that the measured distance is midway between the two readings shown.

The various major elements of the encoder and decoder sections of the present system may comprise more than one part. For example, as shown more clearly in FIG. 8, the moving mask plate 61 may comprise a clear plastic plate 91 having a grid mask film 93 attached directly to an inner surface 95 by any conventional process such as a clear adhesive or bonding agent. The U-shaped back bracket 62 may be of the same material as the plate 91, and the fixed scale 51, like the latter plate, may be a clear plastic scale plate 97 with a film scale mask 98 attached to an inner surface 99, adjacent the film mask 93.

Figure 8:
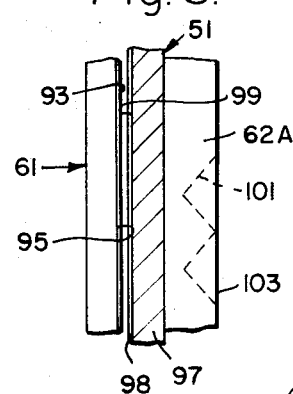
FIG. 8 is an enlarged view of a caliper similar to that seen in FIGS. 5 and 6 which enhances light transmissivity through the device.

The optic devices so far described can be read easily with ambient light, legibility may be improved by the simple technique of using a light transmitting colored plastic material for the backing plate as indicated by reference character 62A in FIG. 8. Also, indentions, shown by dashed outlines 101, may be drilled or otherwise provided in the rear face 103 of the member 62A directly opposite each of the dots or transparent areas in the grid mask film 93.

Figure 9:
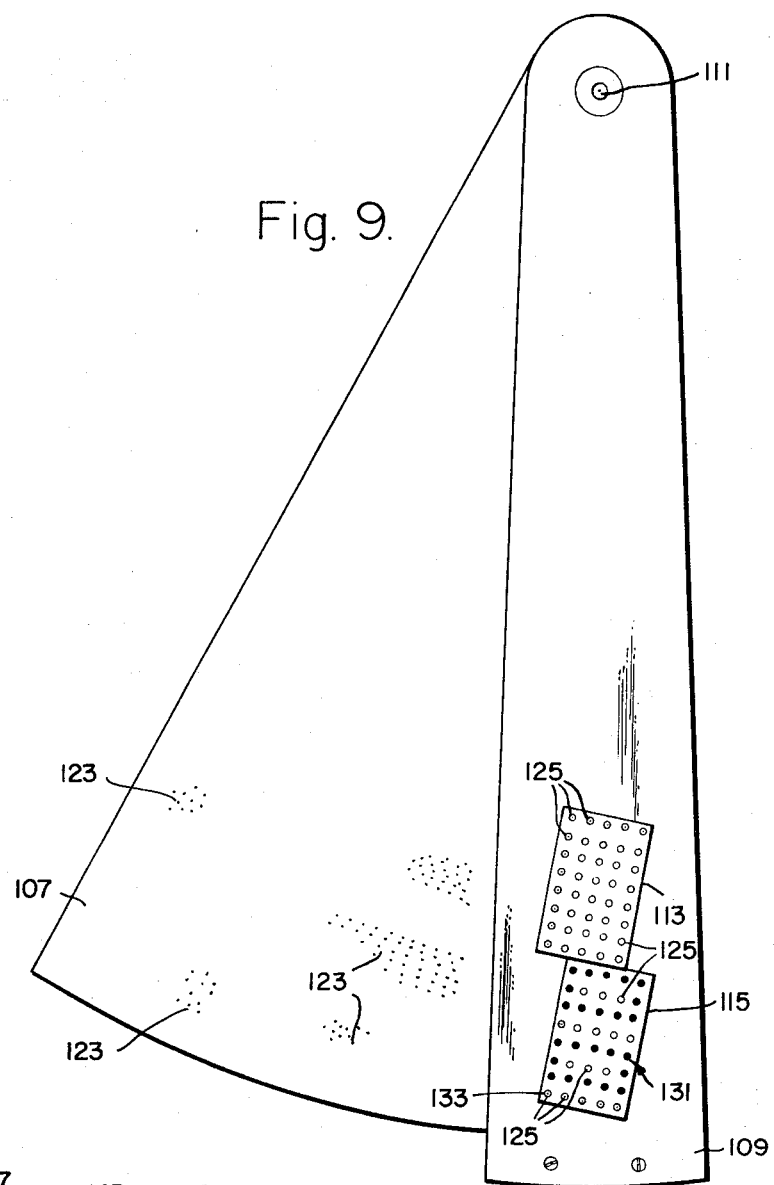
FIG. 9 is a view of a matrix optical digital caliper constructed in accordance with yet another embodiment of the present invention.

Still another embodiment of the present invention is shown in FIG. 9, where a digital measuring caliper 105 includes a scale plate 107 and a matrix mask arm 109 pivotally attached thereto by pin 111. The scale plate 107 has an outwardly extending pointer adjacent one side thereof, and a similarly configured mask pointer 115 is provided at an end 117 opposite the pin 111. In this configuration, the distance between the pointers 113 and 115 can be read directly from the upper or lower windows 119 and 121 in the arm 109. This is accomplished by again providing the scale plate or encoder 107 with a specially arranged grouping of light transmissive areas or holes 123 to form outlines of a series of numerals, as explained in previous embodiments. Also, the decoder or arm 109, carries a plurality of apertures 125 arranged similarly to those described in the matrix mask 23 in FIG. 2, for example.

The resolution obtainable with this embodiment, as well as the others already described, can be enhanced by the use of a matrix lens 131 directly in front of the matrix mask so that each of the dots 125 is magnified by its own associated lens 133. Such a matrix lens may be molded by conventional techniques using any clear plastic or glass material generally considered suitable for this application.

The device of FIG. 9, unlike the linear movement devices discussed before, uses a circular motion to follow a uniform path in the form of an arc. This is important since any irregularities in the relative movement between the major elements of any of the embodiments of the invention would destroy its ability to render an accurate readout with only a simple input. This particular caliper may be provided with readout characters in window 113 which are one-half inch high while measuring with a resolution of two hundredths of an inch.

The same device can display angular measurements in the window 115, for example, to 10 minutes of an arc and may contain various numeral formats plus the entire alphabet in both 5 × 5 and 5 × 7 dot configurations. A further 4 × 1 reduction of the same dot providing film master will produce a matrix optical device which will display clearly legible one-eighth inch high numerals while measuring ten minutes of arc within a 1.75 inch radius.

A further embodiment of the present invention is illustrated in FIGS. 10–13 which uses a rear projection system. Here, a tube structure 141 supports therein transversely to its longitudinal axis a rear projection lens 143, a lens matrix 145, and a moving encoder plate or grid 147 and a ground glass viewing screen 149. Light from a source such as bulb 151, mounted on an end plate 153 of the tube 141, is focused by the projection lens 143 into parallel rays which impinge upon the lens matrix 145. The lens matrix comprises a plurality of focusing lens elements 155 similar to that configured in FIG. 9 as lens matrix 131. This lens arrangement matches the positioning of the dots in a matrix mask and focuses the light to sufficiently small points at the plane of the encoder plate 147 (focal plane of the lens matrix) to eliminate the need for a decoder matrix mask. Only light passing through appropriately positioned holes 157 in the plate 147 will reach the viewing screen 149 to be seen as light areas 159 by the operator of the device. In this embodiment, the plate 147 is movable in a rectilinear direction orthogonal to the plane of the lens matrix 145. The greatest advantage of using this system is that it provides an almost frictional free instrument or gauged dial.

Figure 14:
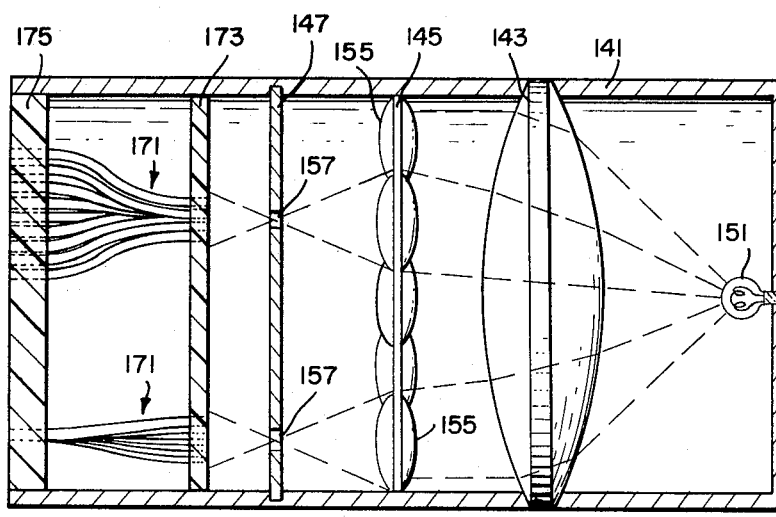
FIG. 14 illustrates still a further embodiment of the present invention wherein fiber optic is utilized.

Another variation of the lens matrix concept is shown in FIG. 14 which uses fiber optic bundles 171 between an input end holding plate 173, positioned where the viewing screen 149 was located in the embodiment of FIG. 10, and an output end holding plate 175. The fiber optic bundles 171 change the shape and position of the light beams 177 produced by the matrix optics for any desired use.

Any technique may be used to produce the encoder and decoder opaque plates having light transmissive areas therein. In a presently preferred method, the matrix devices are photo-reduced negatives of a large scale drawing. A matrix template is used to make the master drawing, and is a plastic sheet drilled with holes corresponding to the dot locations required on the matrix mask. As the matrix template is advanced along the drawing, ink dots are drawn to form the characters required.

This technique is simple but time consuming. Obviously, the modification of existing electronic digital measurement and drafting equipment could be utilized to perform this task. For example, light from a digital readout could be used by bringing such light to a series of points with a matrix mask or lens. An unexposed film plate could be advanced past the original readout in a series of steps and the dots representing the desired numeral for each step would be automatically recorded on the film. A positive copy of this film negative would then be matrix scale.

Since this type of equipment could "program" a matrix optical scale in a matter of seconds, it would be practical to custom calibrate individual instruments. As an example, a pressure gauge with an unexposed film plate could be connected to a pressure source along with an electronic type digital pressure gauge. As the pressure is increased to full scale, the exact digital pressure for each position would automatically be recorded on the film in the gauge.

A similar system could be developed as a matrix optical digital data recorder. In this application, unexposed film would be advanced past the matrix optical instrument or an electronic readout in steps as small as one hundredths of an inch. If the film advance was timed at one tenth inch per second, data would be recorded at a rate of ten readings per second. To read the developed film, a viewer containing a matrix mask matching the one used to "program" the film would be used.

Another class of matrix optic devices according to the present invention could be designed around the use of a transparent ferroelectric-ceramic plate. The ferroelectric plate would function in the same way as the unexposed photographic film except that it can be electronically erased and re-programmed. This type of device would be useful in information storage and retrieval systems such as stock market quotations. A central computer would update the information in a number of matrix optic display consoles where the user could dial the stock of interest.

Other possible uses of the features of the present invention include digital machine tools, drafting machines, AM/FM radio and VHF TV dials, digital slide rules, clocks, mechanical counters, and condensed Braille. In fact, any instrument using an obsolete vernier scale or using gears to amplify a resolution may be enhanced by the techniques described for the present invention.

In view of the foregoing it should be evident that the present invention provides a unique and novel optical readout system which is many times less costly than systems presently available and which provides a higher degree of accuracy and reliability than heretofore possible. It is also important to point out that incorrect readings are made impossible by the invention and in the area where the digital readout is recorded by a camera, the matrix optic devices herein described provide the necessary speed of presentation since there is no measurable delay between the motion of the elements and the digital readout.

Although the invention has been described in several embodiments, it should be clear that it is susceptible to modification and other embodiments. Accordingly, it is intended that the foregoing disclosure and drawings shall be considered only as illustrations of the principles of the invention and are not to be construed in a limiting sense.

What is claimed is:

1. An optical digital measurement readout, the combination comprising:
    a relatively thin flat decoder member having a plurality of spaced light transmissive areas therein arranged in a symmetric slanted basic matrix pattern, said light transmissive areas being small relative to the spacing between said areas;
    a relatively thin flat encoder member disposed adjacent and movable back and fourth in only a parallel uniform path to said decoder member and having a plurality of spaced light transmissive areas therein arranged within and conforming to said matrix pattern and defining consecutively related numerals superimposed over one another, all of said light transmissive areas in both said decoder and encoder member being essentially the same size and shape, each of said numerals being displaced laterally from a preceding numeral by a distance related to the numerical difference between the adjacent numerals, said displacement allowing light to pass consecutively through only registering ones of said light transmissive areas in said members, said registering areas making visible only numerals related to the discrete magnitudes of relative movement between said members.

2. A matrix readout system according to claim 1, wherein said decoder and encoder members are opaque plates, and wherein said light transmissive areas are transparent spaces in said plates.

3. A matrix readout system according to claim 2, wherein said opaque plates are film negatives, and wherein said transparent spaces are unexposed areas therein.

4. A matrix readout system according to claim 3, wherein said film negatives are each attached to a different light transmitting supporting plate of plastic material.

5. A matrix readout system according to claim 2, also comprising, means operatively coupled to said decoder and encoder members includes a U-shaped back bracket attached to said decoder member whereby said encoder member is allowed to slidably move between said decoder member and said back bracket only along a linear path.

6. A matrix readout system according to claim 5, wherein said back bracket is of light transmitting plastic material.

7. A matrix readout system according to claim 6, wherein said plastic material is colored.

8. A matrix readout system according to claim 5, wherein said back bracket is provided with an indenture in the back surface thereof directly opposite each of said light transmitting areas in said decoder plate.

9. A matrix readout system according to claim 1, wherein said basic matrix pattern generally describes a rectangular area.

10. A matrix readout system according to claim 9, wherein said matrix pattern has four columns of seven light transmissive areas.

11. A matrix readout system according to claim 9, wherein said matrix pattern has five columns of seven light transmissive areas.

12. A matrix readout system according to claim 2, wherein said means operatively coupled to said encoder and decoder plates includes a pivot pin pivotally connecting said plates to allow rotational movement therebetween only along a curved path in the form of an arc.

13. A matrix readout according to claim 1, wherein said readout also includes a light source and a screen illuminated by said source, and wherein said decoder member is a stationary lens matrix disposed between said source and said screen; and wherein said encoder member is a movable grid mask disposed between said lens matrix and said screen on the focal plane of the lenses of said lens matrix.

14. A matrix readout according to claim 13, wherein said readout further includes a rear projection lens disposed between said light source and said lens matrix to illuminate said lens matrix with parallel rays of light generated by said source.

15. A matrix readout according to claim 14, wherein said screen is replaced by a fiber optic arrangement to change the shape and position of the light passing through said movable grid mask.

16. A caliper scale including a matrix optical readout, the combination comprising:
   a relatively thin flat decoder plate having a plurality of spaced light transmissive areas therein arranged in a symmetric slanted basic matrix pattern, said light transmissive areas being small relative to the spacing between said areas;
   a relatively thin flat encoder plate disposed adjacent and movable back and forth in only a parallel uniform path to said decoder plate and having a plurality of spaced light transmissive areas therein arranged within and conforming to said matrix pattern and defining consecutively distance related numerals superimposed over one another, all of said light transmissive areas in both said decoder and encoder plates being essentially the same size and shape, said encoder plate and said decoder palate each carrying a jaw member cooperating with each other to measure distance therebetween, each of said numerals being displaced laterally from a preceding numeral by a distance related to the numerical difference between the adjacent numerals, said displacement allowing light to pass consecutively through only registering ones of said light transmissive areas in said plates, said registering areas making visible only numerals related to preselected discrete distances between said jaw members.

* * * * *